(12) United States Patent
Gordon (10) Patent No.: US 9,258,567 B2
(45) Date of Patent: Feb. 9, 2016

(54) METHOD AND SYSTEM FOR USING MOTION PREDICTION TO EQUALIZE VIDEO QUALITY ACROSS INTRA-CODED FRAMES

(71) Applicant: Broadcom Corporation, Irvine, CA (US)

(72) Inventor: Stephen Gordon, North Andover, MA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 13/674,287

(22) Filed: Nov. 12, 2012

(65) Prior Publication Data

US 2013/0070842 A1    Mar. 21, 2013

Related U.S. Application Data

(63) Continuation of application No. 10/986,741, filed on Nov. 12, 2004, now Pat. No. 8,311,113.

(51) Int. Cl.
| | |
|---|---|
| *H04N 7/12* | (2006.01) |
| *H04N 19/154* | (2014.01) |
| *H04N 19/159* | (2014.01) |
| *H04N 19/172* | (2014.01) |
| *H04N 19/124* | (2014.01) |

(52) U.S. Cl.
CPC .......... *H04N 19/154* (2014.11); *H04N 19/124* (2014.11); *H04N 19/159* (2014.11); *H04N 19/172* (2014.11)

(58) Field of Classification Search
CPC .................. H04N 19/00781; H04N 19/00278; H04N 19/00266; H04N 19/00181; H04N 19/00018; H04N 19/0003; H04N 19/00145; H04N 19/00175; H04N 19/00351; H04N 19/0009; H04N 19/00139; H04N 19/00151; H04N 19/001
USPC .................................................... 375/240.02
See application file for complete search history.

(56) References Cited

U.S. PATENT DOCUMENTS

| | | | | |
|---|---|---|---|---|
| 6,804,301 | B2 * | 10/2004 | Wu ...................... | H04N 19/503 348/700 |
| 7,116,715 | B2 | 10/2006 | Yoneyama et al. | |
| 7,555,043 | B2 * | 6/2009 | Sato ..................... | H04N 19/176 375/240.16 |
| 7,936,818 | B2 * | 5/2011 | Jayant .................... | H04N 19/00 375/240.05 |
| 2003/0063667 | A1 | 4/2003 | Sriram et al. | |
| 2004/0213470 | A1 | 10/2004 | Sato et al. | |
| 2004/0264571 | A1 * | 12/2004 | Zhang .................. | H04N 19/197 375/240.16 |
| 2005/0008240 | A1 | 1/2005 | Banerji et al. | |
| 2005/0058197 | A1 | 3/2005 | Lu et al. | |
| 2005/0069211 | A1 * | 3/2005 | Lee ...................... | H04N 19/172 382/239 |
| 2006/0239355 | A1 * | 10/2006 | Sriram et al. ............. | 375/240.16 |
| 2007/0047648 | A1 * | 3/2007 | Tourapis et al. ......... | 375/240.13 |
| 2007/0147512 | A1 * | 6/2007 | Eckart .................. | H04N 19/176 375/240.24 |

* cited by examiner

*Primary Examiner* — Jessica M Prince
(74) *Attorney, Agent, or Firm* — Brinks Gilson & Lione (57) ABSTRACT

In a video processing system, a method and system for using motion estimation to equalize video quality across intra frames are provided. Inter-prediction processing may be enabled for macroblocks in an "I" frame to generate temporal statistics. The inter-prediction processing may comprise motion estimation and motion compensation. Spatial statistics may be generated from the macroblocks in the "I" frame. A rate control may be determined based on the inter-prediction processing and spatial statistics.

21 Claims, 4 Drawing Sheets

METHOD AND SYSTEM FOR USING MOTION PREDICTION TO EQUALIZE VIDEO QUALITY ACROSS INTRA-CODED FRAMES

CROSS REFERENCE TO RELATED APPLICATIONS

This application is a continuation of and claims the benefit of U.S. patent application Ser. No. 10/986,741 filed Nov. 12, 2004, the content of which is hereby incorporated by reference in its entirety.

TECHNICAL FIELD

Certain embodiments of the invention relate to the decoding of video signals. More specifically, certain embodiments of the invention relate to a method and system for using motion estimation to equalize video quality across intra frames.

BACKGROUND

In video compression systems, a source video sequence may be partitioned into successive groups of pictures or GOPs, where each picture or frame in the GOP may be of a pre-defined frame coding type. These frame coding types may comprise intra-coded frames, predicted frames, and bidirectional-predicted frames. The intra-coded or "I" frames may only use the information within the frame to perform video compression. These self-contained "I" frames provide a base value or anchor that is an estimate of the value of succeeding frames. Each GOP may generally start with a self-contained "I" frame as the reference or anchor frame from which the other frames in the group may be generated for display. The GOP frequency, and correspondingly the frequency or periodicity of "I" frames, may be driven by specific application spaces. The predicted or "P" frames may use a motion estimation scheme to generate picture elements that may be predicted from the most recent anchor frame or "I" frame. Compressing the difference between predicted samples and the source value results in better coding efficiency than that which may be achieved by transmitting the encoded version of the source frame information. At a receiver or decoder side, the compressed difference frame is decoded and subsequently added to a predicted frame for display. In some instances, for example, as recommended by the International Telecommunications Union Telecommunications Standardization Sector (ITU-T) video coding standard H.264, intra-coded or "I" frames may also utilize prediction, however, prediction must be formed from information provided within the frame.

The bidirectional-predicted frames or "B" frames may use multiple frames that occur in a future location in the video sequence and/or in a past location in the video sequence to predict the image samples. For "B" frames, the reference frame may be temporally later in a display order, however, the reference frame must precede the "B" frame in the coding order. As with "P" frames, motion estimation may be used for pixel prediction in "B" frames and the difference between the original source and the predicted frames may be compressed. At the receiver or decoder end, one or more "B" frames may be motion compensated and may be added to the decoded version of the compressed difference signal for display. Since both the "P" frames and "B" frames may be based on other frames, they may be referred to as inter-coded frames.

Since "I" frames are coded independently of any other frames, they may require more bits than other frame coding types. The "B" frames may depend on multiple predictions and may not generally be used to predict samples in other frames, therefore "B" frames may require fewer number of bits than "I" frames. The number of bits necessary for "P" frame coding may be somewhere between the number of bits necessary for "I" frames and "B" frames. The number of bits allocated for a specified GOP, the bit rate, may vary and may depend on the system requirements and/or its operation. The ratio of bit rates between "I", "P", and "B" frame coding types in a specified GOP bit rate may be chosen such that the coding may result in similar or equal video quality, or similar distortion artifacts, for the various frame types.

A digital video encoder, for example, may be required to assign the number of bits for each frame type subject to conditions set by the bandwidth of the transmission channel and/or by the size of a storage device, all while maintaining optimum video quality. A rate control may be typically used to predict the number of frame bits to be allocated and quantization parameters for a frame coding type. Rate control is the task of ensuring the encoded bitstream meets the bit rate requirements of the transmission channel or storage medium while optimizing quality. In this regard, the bit rate requirements may, in some instances, be larger than an average bit rate. Adapting the rate control in a video encoder to achieve video quality equalization may also have to be optimized so that it may be implemented in an integrated circuit (IC).

Demands for cutting edge encoding technology is driven by the fact that good quality encoded bitstreams at low bit rates may be required in certain video applications. In practice, the task of achieving consistent video quality among frame types at low to medium bit rates may be a very difficult one. For example, "I" frames may be used to support certain low bit rate operational functions such as random access, fast forward, and/or rewind because "I" frames are self-contained and there is a lesser need for complex reconstruction calculations and/or storage of multiple frames for prediction as is the case with "P" and "B" frames. However, consecutive "I" frames may exhibit a lack of temporal consistency because of their relative separation in the video sequence when compared to the higher frequency with which "P" or "B" frames occur. When a video compression system is operated at low to medium bit rate settings, it may be difficult implement a rate control that maintains temporally consistent image quality between motion compensated "P" and "B" frames and non-motion compensated "I" frames. The result of this temporal inconsistency may be a noticeable beating of the video sequence that has the same frequency as the frequency at which the "I" frames occur.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for using motion estimation to equalize video quality across intra frames. Aspects of the method may comprise inter-prediction processing of at least one current macroblock of an "I" frame in a video sequence. A signal may be generated that enables the inter-prediction processing when a current macroblock of the "I" frame is to be processed. The inter-prediction processing may comprise motion estimation and motion compensation operations.

In another aspect of the method, temporal statistics may be generated based on the inter-predicted macroblocks of the "I" frame. The temporal statistics may comprise average sum of absolute differences parameters, motion vector consistency parameters, and prediction consistency parameters. Spatial statistics may be generated based on the macroblocks of the "I" frame. The spatial statistics may comprise local variance parameters and local dynamic range parameters. A rate control may be determined based on the generated temporal statistics and spatial statistics. A number of bits may be allocated for the "I" frame based on the rate control. Moreover, a portion of the number of bits for the "I" frame may be allocated for a current macroblock also based on the rate control. Quantization parameters for the current macroblocks of the "I" frame may be determined based on the rate control.

The method may also comprise intra-prediction processing of the current macroblock of the "I" frame. A prediction mode may be determined for the current macroblock of the "I" frame, where the determined prediction mode may be an intraprediction mode. A type of motion block size may also be determined for the determined prediction mode. Prediction residuals to be encoded may be generated based on the determined quantization parameters and the intra-predicted current macroblock of the "I" frame.

Aspects of the system may comprise circuitry for inter-prediction processing of at least one current macroblock of an "I" frame in a video sequence. Circuitry may be provided to generate a signal that enables the inter-prediction processing when a current macroblock of the "I" frame is to be processed. The circuitry for inter-prediction processing may comprise circuitry for motion estimation and circuitry for motion compensation operations.

In another aspect of the system, circuitry may be provided to generate temporal statistics based on the inter-predicted macroblocks of the "I" frame. The generated temporal statistics may comprise average sum of absolute differences parameters, motion vector consistency parameters, and prediction consistency parameters. Spatial statistics may be generated by circuitry based on the macroblocks of the "I" frame. The spatial statistics may comprise local variance parameters and local dynamic range parameters. Additional circuitry may be provided for determining a rate control based on the generated temporal statistics and spatial statistics. Circuitry for allocating a number of bits for the "I" frame based on the rate control may be provided. Moreover, a portion of the number of bits for the "I" frame may be allocated for a current macroblock by circuitry also based on the rate control. Circuitry may be provided for determining quantization parameters for the current macroblocks of the "I" frame based on the rate control.

The system may also comprise circuitry for intra-prediction processing of the current macroblock of the "I" frame. A prediction mode may be determined by circuitry for the current macroblock of the "I" frame, where the determined prediction mode may be an intra-prediction mode. Circuitry may be provided for determining a type of motion block size for the determined prediction mode. Prediction residuals to be encoded may be generated by circuitry based on the determined quantization parameters and the intra-predicted current macroblock of the "I" frame.

These and other advantages, aspects and novel features of the present invention, as well as details of an illustrated embodiment thereof, will be more fully understood from the following description and drawings.

DETAILED DESCRIPTION

Certain embodiments of the invention may be found in a method and system for using motion estimation to equalize video quality across intra frames. Enabling inter-prediction processing of "I" frames may generate temporal statistics. The temporal statistics may then be utilized, in addition to spatial statistics, to determine a rate control for the operation of a video compression system. The rate control may be utilized to allocate a number of bits for encoding the macroblocks in an "I" frame. Moreover, the rate control may be utilized to determine the quantization parameters for scaling the current "I" frame macroblock being processed. This approach may allow the video compression system to provide a higher quality and more constant quality video sequence by reducing the beating that occurs at low to medium bit rates as a result of inconsistencies that may arise between "I" frames in the video sequence.

Figure 1:
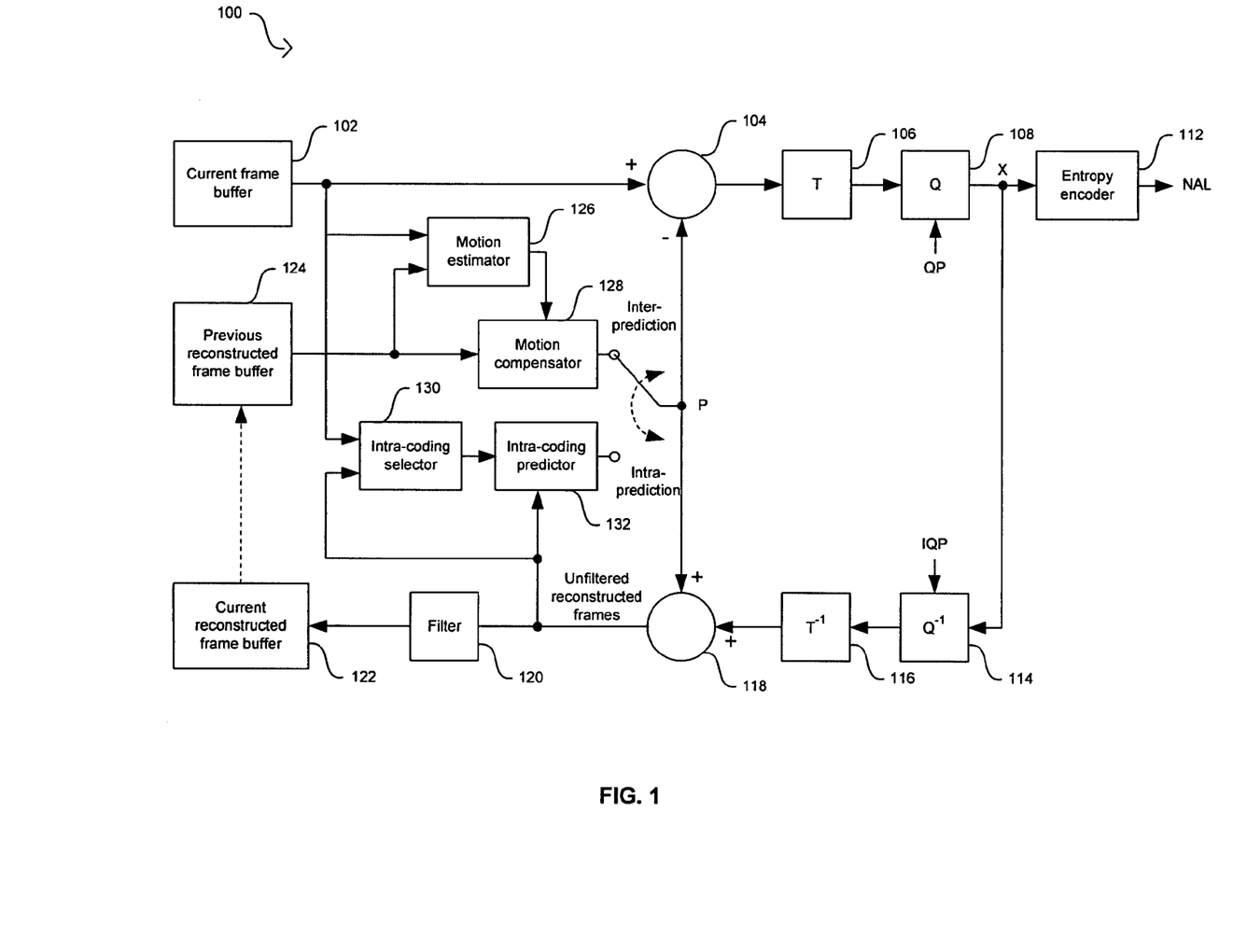
FIG. 1 is a block diagram of an exemplary encoding system, in connection with an embodiment of the invention.

FIG. 1 is a block diagram of an exemplary encoding system, in connection with an embodiment of the invention. Referring to FIG. 1, the encoding system 100 may comprise a current frame buffer 102, a first digital adder 104, a transformer (T) 106, a quantizer (Q) 108, an entropy encoder 112, a reverse quantizer ($Q^{-1}$) 114, a reverse transformer ($T^1$) 116, a second digital adder 118, a filter 120, a current reconstructed frame buffer 122, a previous reconstructed frame buffer 124, a motion estimator 126, a motion compensator 128, an intra-coding selector 130, and an intra-coding predictor 132.

The current frame buffer 102 may comprise suitable logic, circuitry, and/or code that may be adapted to store macroblocks of a current frame to be encoded. The current frame to be encoded may be encoded as an "I" frame, a "P" frame, or a "B" frame according to the location of the frame in a GOP structure or video sequence. The previous reconstructed frame buffer 124 may comprise suitable logic, circuitry, and/or code that may be adapted to store macroblocks of previously reconstructed frames. Previously reconstructed frames may comprise frames which have been encoded, decoded, and reconstructed and which may occur before and/or after the current frame in the video sequence. The macroblocks of previously reconstructed frames may to be utilized for inter-prediction processing. Interprediction processing may comprise operations performed by the motion estimator 126 and/or the motion compensator 128. The current reconstructed frame buffer 122 may comprise suitable logic, circuitry, and/or code that may be adapted to store macroblocks of a current reconstructed frame before transfer to the previous reconstructed frame buffer 124. The current frame buffer 102, the previous reconstructed frame buffer 124, and the current reconstructed frame buffer 122 may comprise a portion of a memory system, such as a dynamic random access memory (DRAM).

The first digital adder 104 and the second digital adder 118 may comprise suitable logic, circuitry, and/or code that may be adapted to generate a difference macroblock and a reconstructed difference macroblock respectively. The difference macroblock and the reconstructed difference macroblock may be based on generated prediction macroblocks P. The first digital adder 104 may be utilized in the encoding portion or encoding path of the encoding system 100 and the second digital adder 118 may be utilized in the decoding path of the encoding system 100.

The transformer (T) 106 may comprise suitable logic, circuitry, and/or code that may be adapted to transform the spatial information in the difference macroblock to corresponding spatial frequencies using a two-dimensional or spatial Discrete Cosine Transform (DCT) operation. The quantizer (Q) 108 may comprise suitable logic, circuitry, and/or code that may be adapted to scale the spatial frequencies into the quantized coefficients X by utilizing the quantization parameters QP. The result of the scaling operation in the quantizer 108 may comprise side information, for example, inter-coding or intra-coding mode information, motion vector information, quantization parameter information, and/or boundary pixel values, which may be transferred to the entropy encoder 112. The entropy encoder 112 may comprise suitable logic, circuitry, and/or code that may be adapted to entropy encode the quantized coefficients X and the side information before transfer to the Network Abstraction Layer (NAL).

The reverse quantizer ($Q^{-1}$) 114 may comprise suitable logic, circuitry, and/or code that may be adapted to rescale the quantized coefficients X by utilizing the inverse quantization parameters IQP. The reverse transformer ($T^1$) 116 may comprise suitable logic, circuitry, and/or code that may be adapted to inverse transform spatial frequency information to corresponding spatial information using a two-dimensional or spatial Inverse Discrete Cosine Transform (IDCT) operation.

The motion estimator 126 may comprise suitable logic, circuitry, and/or code that may be adapted to perform motion estimation operations of current frames from the current frame buffer 102 by utilizing a current frame from the current frame buffer 102 and previously reconstructed frames stored in the previous reconstructed frame buffer 124. The motion estimator 126 may generate a plurality of motion vectors that correspond to the current frame based on spatial and temporal differences between the current frame and the previously reconstructed frames utilized for motion estimation. The motion compensator 128 may comprise suitable logic, circuitry, and/or code that may be adapted to perform motion compensation operations on the motion vectors generated by the motion estimator 126 by utilizing previously reconstructed frames stored in the previous reconstructed frame buffer 124. The motion compensator 128 may then generate inter-prediction macroblocks P.

The filter 520 may comprise suitable logic, circuitry, and/or code that may be adapted to spatially filter an output stream received from the second digital adder 118 to reduce blocking artifacts. The output stream from the second digital adder 118 may comprise unfiltered reconstructed macroblocks that make up unfiltered reconstructed frames of video. The intra-coding selector 130 may comprise suitable logic, circuitry, and/or code that may be adapted to select between a current frame from the current frame buffer 102 and unfiltered reconstructed frames from the second digital adder 118. The intra-coding predictor 132 may comprise suitable logic, circuitry, and/or code that may be adapted to generate intra-predicted macroblocks P based on the output of the intra-coding selector 130 and unfiltered reconstructed frames from the second digital filter 118. Intra-prediction processing may refer to processing operations that comprise the operations performed by the intra-coding selector 130 and/or the intra-coding predictor 132.

Figure 2A:
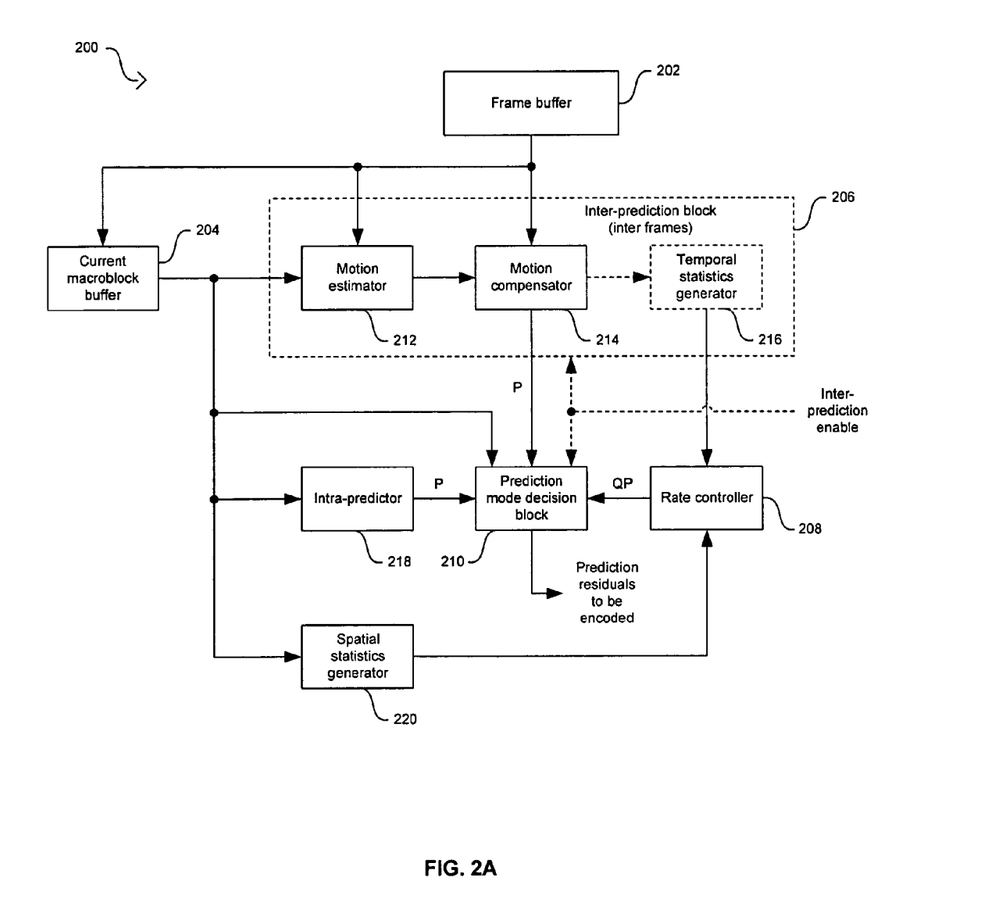
FIG. 2A is a block diagram of a conventional quantization parameter selection scheme for "I" frames that may be utilized in an encoding system, in connection with an embodiment of the invention.

FIG. 2A is a block diagram of a conventional quantization parameter selection scheme for "I" frames that may be utilized in an encoding system, in connection with an embodiment of the invention. Referring to FIG. 2A, an encoding system 200 that utilizes a conventional quantization parameter selection scheme for "I" frames may comprise a frame buffer 202, a current macroblock buffer 204, an inter-prediction block 206, a rate controller 208, a prediction mode decision block 210, an intra-predictor 218, and a spatial statistics generator 220. The inter-prediction block 206 may comprise a motion estimator 212, a motion compensator 214, and a temporal statistics generator 216.

The frame buffer 202 may comprise suitable logic, circuitry, and/or code that may be adapted to store macroblocks of a plurality of previously reconstructed frames and/or current frames. The current macroblock buffer 204 may comprise suitable logic, circuitry, and/or code that may be adapted to store at least one macroblock of a current frame being processed. The macroblocks in the current macroblock buffer 204 may have been transferred from the frame buffer 202 for processing. The macroblock may be a block of 16×16 pixels, for example. The frame buffer 202 and the current macroblock buffer 204 may comprise a portion of a memory system, such as a dynamic random access memory (DRAM).

The inter-prediction block 206 may comprise suitable logic, circuitry, and/or code that may be adapted for performing inter-prediction processing on a current macroblock and to generate a plurality of temporal statistics based on the results of the inter-prediction processing. Inter-prediction processing may comprise operations performed by the motion estimator 212 and the motion compensator 214. An inter-prediction enable signal may be utilized to indicate to the inter-prediction block 206 that the current macroblock corresponds to that of an inter-coded frame, for example, a "P" or "B" frame, and that the motion estimator 212, the motion compensator 214, and the temporal statistics generator 218 may be enabled for processing the current macroblock. In another embodiment, the inter-prediction block 206 may receive an inter-prediction disable signal that may be utilized to indicate that the current macroblock corresponds to that of an intra-coded or "I" frame and that the motion estimator 212, the motion compensator 214, and the temporal statistics generator 218 may be disabled for processing the current macroblock.

The motion estimator 212 may comprise suitable logic, circuitry, and/or code that may be adapted to generate motion vectors that correspond to the current macroblock based on previously reconstructed macroblocks from the frame buffer 202. The motion compensator 214 may comprise suitable logic, circuitry, and/or code that may be adapted to process the motion vectors generated by the motion estimator 212 and the previously reconstructed macroblocks from the frame buffer 202 to generate inter-prediction macroblocks P. The motion compensator 214 may also provide information that corresponds to the generated inter-prediction macroblocks P to the temporal statistics generator 216 for further processing. The motion compensator 214 may transfer the inter-prediction macroblocks P to the prediction mode decision block 210.

The temporal statistics generator 216 may comprise suitable logic, circuitry, and/or code that may be adapted to generate a plurality of current temporal statistical parameters for the current macroblock. The temporal statistics generator 216 may generate average sum of absolute differences (SAD)

parameters, average sum of squared difference parameters, motion vector consistency parameters, and/or prediction consistency parameters, for example. The current temporal statistical parameters may be determined based on previously generated temporal statistical parameters from previously processed current macroblocks. The temporal statistics generator 216 may transfer the current temporal statistical parameters to the rate controller 208.

The intra-predictor 218 may comprise suitable logic, circuitry, and/or code that may be adapted to generate intra-prediction macroblocks P from a current macroblock being processed. An intra-prediction enable signal may be utilized to indicate to the intra-predictor 218 that the current macroblock corresponds to that of an intra-coded or "I" frame and that intra-predictor 218 may be enabled for processing the current macroblock. In another embodiment, the intra-predictor 218 may receive an intra-prediction disable signal that may be utilized to indicate that the current macroblock corresponds to that of an inter-coded frame, for example, a "P" or "B" frame, and that the intra-predictor 218 may be disabled for processing the current macroblock. The intra-predictor 218 may transfer the intra-prediction macroblocks P to the prediction mode decision block 210.

The spatial statistics generator 220 may comprise suitable logic, circuitry, and/or code that may be adapted to generate a plurality of current spatial statistical parameters for the current macroblock. The spatial statistics generator 220 may generate local variance parameters and local dynamic range parameters, for example. The current spatial statistical parameters may be determined based on previously generated spatial statistical parameters from previously processed current macroblocks. For example, when measuring the relative complexity of one portion of a frame relative to another portion of a frame, the so-called spatial activity, the spatial statistics generator 220 may first measure the local variance parameter for all macroblocks in a frame and then determine an average local variance parameter for the frame. In this regard, a complexity measure may refer to the average local variance parameter and a relative complexity measure may refer to the local variance parameter of a macroblock in the frame. A similar approach as the one described for determining local variance parameters may be followed when determining local dynamic range parameters. The spatial statistics generator 220 may transfer the current spatial statistical parameters to the rate controller 208. Current spatial statistical parameters may be generated for current macroblocks that correspond to intra-coded frames and to inter-coded frames.

The rate controller 208 may comprise suitable logic, circuitry, and/or code that may be adapted to determine the number of bits to be allocated to a current frame being processed and to the macroblocks that comprise the current frame being processed. The rate controller 208 may also generate the quantization parameters QP that may be utilized to scale the spatial frequencies generated from the predicted macroblocks P. The number of bits to be allocated and the quantization parameters QP may be based the remaining number of available bits for the specified GOP bit rate and the current spatial statistical parameters. Moreover, when the current macroblock corresponds to an inter-coded frame, the number of bits to be allocated and the quantization parameters QP may also be based on the current temporal statistical parameters provided by the temporal statistical generator 216.

The prediction mode decision block 210 may comprise suitable logic, circuitry, and/or code that may be adapted to generate prediction residuals which may be encoded before transfer to the Network Abstraction Layer. An inter-prediction enable signal may be utilized to indicate to the prediction mode decision block 210 that the current macroblock corresponds to an inter-coded frame and that inter-predicted macroblocks P from the motion compensator 214 may be utilized. When the inter-prediction enable signal is not asserted, the prediction mode decision block 210 may utilize the intra-predicted macroblocks P from the intra-predictor 218. In another embodiment, an intra-prediction enable signal may be utilized to indicate to the prediction mode decision block 210 that the current macroblock corresponds to an intracoded frame and that intra-predicted macroblocks P from the intra-predictor 218 may be utilized. When the intra-prediction enable signal is not asserted, the prediction mode decision block 210 may utilize the inter-predicted macroblocks P from the motion compensator 214. In this regard, the prediction mode decision block 210 may operate in either a inter-prediction mode for "P" and "B" frames or an intra-prediction mode for "I" frames.

The prediction mode decision block 210 may process the predicted macroblock and the current macroblock to generate spatial frequencies that correspond to the current macroblock. The prediction mode decision block 210 may determine a type of motion block size for macroblock processing. The prediction mode decision block 210 may scale the generated spatial frequencies by utilizing the quantization parameters QP provided by the rate controller 208. The prediction residuals may comprise the scaled spatial frequencies and additional side information that corresponds to the current macroblock.

Figure 2B:
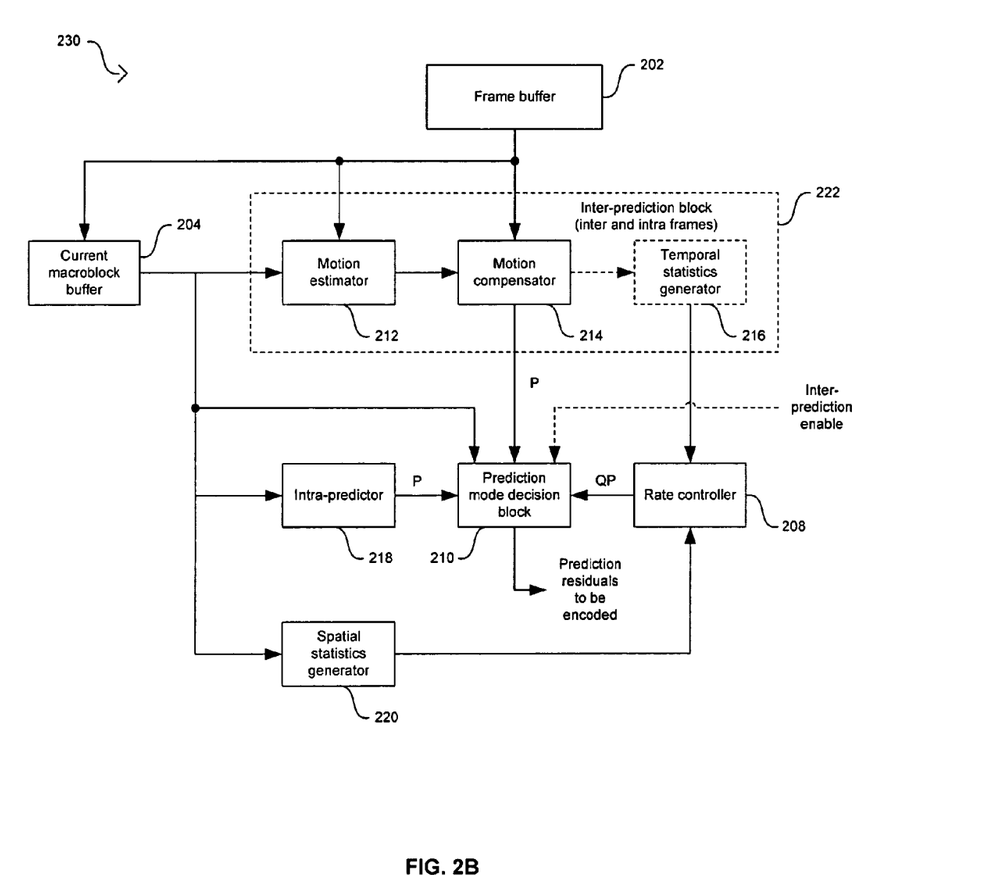
FIG. 2B is a block diagram of an exemplary quantization parameter selection scheme for equalizing video across "I" frames that may be utilized in an encoding system, in accordance with an embodiment of the invention.

FIG. 2B is a block diagram of an exemplary quantization parameter selection scheme for equalizing video across "I" frames that may be utilized in an encoding system, in accordance with an embodiment of the invention. Referring to FIG. 2B, an encoding system 230 that utilizes a quantization parameter selection scheme that equalizes video across "I" frames may comprise a frame buffer 202, a current macroblock buffer 204, an inter-prediction block 222, a rate controller 208, a prediction mode decision block 210, an intra-predictor 218, and a spatial statistics generator 220. The inter-prediction block 222 may comprise a motion estimator 212, a motion compensator 214, and a temporal statistics generator 216.

The encoding system 230 may differ from the encoding system 200 in FIG. 2A in that the inter-prediction block 222 may provide motion estimation, motion compensation, and temporal statistical generation operations for both inter-coded frames and intracoded frames. In this regard, the inter-prediction block 222 may not require an enabling signal since current temporal statistical parameters may be generated for all current macroblocks. In another embodiment, the inter-prediction block 222 may receive an enabling signal that enables inter-prediction processing and generation of temporal statistics for all current macroblocks. Moreover, the motion compensator 214 in the inter-prediction block 222 may transfer the inter-predicted macroblocks P to the prediction mode decision block 210 even when the current macroblock corresponds to that of an intra-coded frame. In this regard, an inter-prediction enable signal may be utilized to indicate to the prediction mode decision block 210 when the inter-predicted macroblock P received from the motion compensator 214 corresponds to that of an inter-coded frame.

The encoding system 230 may also differ from the encoding system 200 in FIG. 2A in that the rate controller 208 may determine, for both inter-coded frames and intracoded frames, the number of bits to be allocated and the quantization parameters QP to be utilized based on the remaining number of available bits for the specified GOP bit rate, the current spatial statistical parameters provided by the spatial statistical generator 220, and the current temporal statistical parameters provided by the temporal statistical generator 216. In this regard, bits allocated and the quantization parameters QP to be utilized for each macroblock of an intra-coded frame may be determined based on temporal statistical parameters such as the average sum of absolute differences (SAD) parameters, average sum of squared difference parameters, motion vector consistency parameters, and/or prediction consistency parameters.

The rate controller 208 in the encoding system 230 may, for example, allocate more bits from the GOP bit rate to an "I" frame when the current temporal statistical parameters provide that a previous frame looks very similar to the current "I" frame. The reason for this approach is that more bits allocated to the current "I" frame allows it to predict better and the quality of the video sequence may get equalized from one GOP to the next GOP. A similar approach may be followed when allocating bits within the frame as current temporal statistical parameters may provide that certain macroblocks within the "I" frame look similar to corresponding macroblocks in a previous frame.

The rate controller 208 in the encoding system 230 may determine an optimal allocation of bits in a current "I" frame or in the macroblocks that form the current "I" frame, based on the consistency information provided by the current temporal statistical parameters generated by the temporal statistics generator 216 and the complexity information provided by the current spatial statistical parameters generated by the spatial statistics generator 220.

Figure 3:
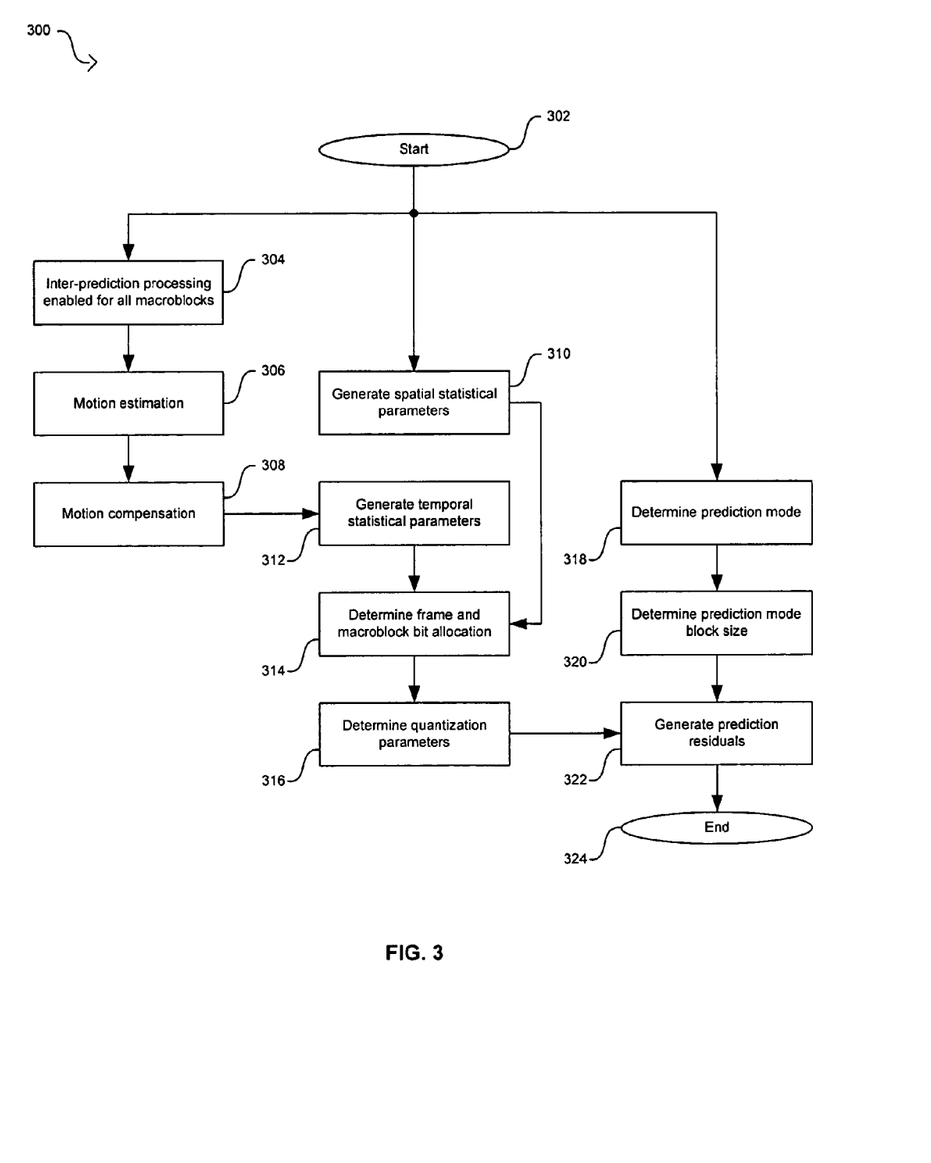
FIG. 3 is a flow diagram illustrating exemplary steps for the equalization of intracoded frames utilizing inter-prediction processing, in accordance with an embodiment of the invention.

FIG. 3 is a flow diagram illustrating exemplary steps for the equalization of intracoded frames utilizing inter-prediction processing, in accordance with an embodiment of the invention. Referring to FIG. 3, after start step 302, in step 304 of the flow diagram 300, inter-prediction or motion-based prediction processing may be enabled in the inter-prediction block 222 of FIG. 2B, for example. In step 306, motion estimation may be performed by the motion estimator 212, for example, on macroblocks of either intracoded or inter-coded frames. In step 308, the motion vectors and additional information generated by the motion estimator 212 in step 306 may be transferred to the motion compensator 214, for example, to generate the inter-prediction macroblocks P.

Also after start step 302, in step 310 of the flow diagram 300, spatial statistical parameters may be generated by the spatial statistics generator 220, for example, on macroblocks of either intra-coded or inter-coded frames. In step 312, temporal statistical parameters may be generated by the temporal statistics generator 216, for example, based on the results of the inter-prediction or motion-based prediction processing performed by the motion estimator 212 and/or the motion compensator 214. In step 314, the spatial statistical parameters generated in step 310 and the temporal statistical parameters generated in step 312 may be utilized by the rate controller 208, for example, to determine the allocation of bits for a current intra-coded frame and for the macroblocks of the current intra-coded frame. In step 316, the rate controller 208 may determine the quantization parameters QP for the macroblocks of the current intra-coded frame.

Also after start step 302, in step 318 of the flow diagram 300, the prediction mode of the current frame may be determined. The prediction mode may be an intra-prediction mode for "I" frames or an inter-prediction mode for "P" and "B" frames. In step 320, the mode block size to be utilized by the prediction mode decision block 210, for example, may be determined. In H.264 standard, for example, a plurality of mode block sizes may be selected for generating prediction residuals. In step 322, the prediction mode decision block 210 may generate prediction residuals that correspond to the macroblocks of the current "I" frame being processed. The prediction residuals may be determined based on the quantization parameters QP generated in step 316, the prediction mode determined in step 318, and the prediction mode size selected in step 320. Once the prediction residuals have been completed for a macroblock in the "I" frame being processed, a similar approach may be followed to generate prediction residuals for all other macroblocks in the "I" frame. The end step 324 may be reached when the all the macroblocks in the "I" frame have been processed and the total number of bits available for the "I" frame have been optimally distributed among the macroblocks based on the relative complexity and relative consistency of the frame.

The approach described above may allow a video compression system to provide a higher quality and more constant quality video sequence by more efficiently allocating the number of available bits in a GOP bit rate to intra-coded or "I" frames. Moreover, the number of bits allocated and the quantization parameters QP utilized in each macroblock of the "I" frame being processed may be optimized to reduce the beating that occurs at low to medium bit rates as a result of inconsistencies that may arise between "I" frames in the video sequence.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for encoding a video sequence, the method comprising:
   selecting a frame of a group of pictures (GOP) that has been designated as an intra-coded frame;
   inter-prediction processing of at least one current macroblock of the intra-coded frame;

generating spatial statistics of the at least one current macroblock of the intra-coded frame;

determining a rate control for video encoding based on temporal statistics from the inter-prediction processing and the spatial statistics of the at least one current macroblock of the intra-coded frame; and allocating a number of bits to the intra-coded frame from a total number of bits allocated to the GOP based on the determined rate control.

2. The method according to claim 1, further comprising determining a prediction mode for the at least one current macroblock of the intra-coded frame based on the inter-prediction processing and intra-prediction processing.

3. The method according to claim 2, wherein the determined prediction mode is an intra-prediction mode.

4. The method according to claim 2, further comprising determining a type of motion block size for the determined prediction mode.

5. The method according to claim 1, wherein the inter-prediction processing of the at least one current macroblock of the intra-coded frame comprises motion estimation and motion compensation operations.

6. The method according to claim 1, further comprising allocating the number of bits to the intra-coded frame based on a consistency of the intra-coded frame with respect to a previous intra-coded frame in the video sequence.

7. The method according to claim 1, further comprising allocating a portion of the number of bits to the at least one current macroblock of the intra-coded frame based on the determined rate control.

8. A system for encoding a video sequence, the system comprising:

circuitry configured to select a current frame of a group of pictures of the video sequence as an intra-coded frame;

circuitry configured to allocate the current frame a number of bits based on the selection as an intra-coded frame of the group of pictures;

circuitry configured to calculate temporal statistics and spatial statistics of at least one current macroblock of the current frame, wherein the temporal statistics indicate a similarity between the at least one current macroblock and a corresponding macroblock from a previous intra-coded frame, and the spatial statistics indicate similarity between the at least one current macroblock and rest of the current frame; and circuitry configured to allocate a portion of the number of bits for the current frame to encode the at least one current macroblock based on the temporal statistics and the spatial statistics.

9. The system according to claim 8, comprising circuitry configured to perform inter-prediction processing of the at least one current macroblock of the current frame to calculate the temporal statistics, wherein the inter-prediction processing of the at least one current macroblock of the intra-coded frame comprises motion estimation and motion compensation operations.

10. The system according to claim 8, further comprising circuitry for determining a prediction mode for the at least one current macroblock of the intra-coded frame.

11. The system according to claim 10, wherein the determined prediction mode is an intra-prediction mode.

12. The system according to claim 10, further comprising circuitry for determining a type of motion block size for the determined prediction mode.

13. A non-transitory computer readable storage medium having stored therein instructions executable by a processor for encoding a video sequence, the storage medium comprising instructions for:

selection of a current macroblock of a frame in the video sequence, wherein the frame has been selected as an intra-coded frame;

generation of temporal statistics of the current macroblock of the intra-coded frame based on inter-prediction processing and a previous intra-coded frame;

generation of spatial statistics of the current macroblock of the intra-coded frame based on comparison with other macroblocks of the intra-coded frame;

identification of a first number of bits remaining from a total number of bits allocated to the intra-coded frame; and allocation of a portion of the first number of bits to the current macroblock based on the temporal statistics.

14. The non-transitory computer readable storage medium according to claim 13, wherein the generated temporal statistics comprise average sum of absolute differences parameters, average sum of squared difference parameters, motion vector consistency parameters, and prediction consistency parameters.

15. The system of claim 8, wherein macroblocks of said intra-coded frame are intra-prediction encoded.

16. The method of claim 6, wherein the number of bits allocated to the intra-coded frame is proportional to a similarity of the intra-coded frame to the previous intra-coded frame.

17. The method of claim 7, wherein the portion of the number of bits allocated to the at least one current macroblock is proportional to a similarity of the at least one current macroblock to a corresponding macroblock of a previous intra-coded frame.

18. The method of claim 1, further comprising generating a signal that enables said inter-prediction processing of the at least one current macroblock of the intra-coded frame.

19. The system of claim 9, further comprising circuitry configured to generate a signal that enables inter-prediction processing of the current macroblock of the current intra-coded frame.

20. The system of claim 8, wherein the number of bits allocated to the current frame is a predetermined number of bits based on the current frame being identified as an intra-coded frame.

21. The non-transitory computer readable storage medium of claim 13, wherein a frequency of intra-coded frames in the video sequence being encoded is the same as a frequency of the video sequence.

\* \* \* \* \*